United States Patent
Agamy et al.

(10) Patent No.: US 11,196,278 B2
(45) Date of Patent: Dec. 7, 2021

(54) CONTROL SYSTEM AND METHOD FOR AN ENERGY STORAGE SYSTEM

(71) Applicant: GENERAL ELECTRIC COMPANY, Schenectady, NY (US)

(72) Inventors: Mohammed Agamy, Niskayuna, NY (US); Ramanujam Ramabhadran, Niskayuna, NY (US); Kenneth McClellan Rush, Ballston Spa, NY (US); Luca Tonini, Schenectady, NY (US); Ahmed Elasser, Latham, NY (US); Herman Lucas Norbert Wiegman, Essex Junction, VT (US)

(73) Assignee: General Electric Company, Schenectady, NY (US)

( * ) Notice: Subject to any disclaimer, the term of this patent is extended or adjusted under 35 U.S.C. 154(b) by 103 days.

(21) Appl. No.: 16/614,074

(22) PCT Filed: May 30, 2018

(86) PCT No.: PCT/US2018/035066
§ 371 (c)(1),
(2) Date: Nov. 15, 2019

(87) PCT Pub. No.: WO2018/222672
PCT Pub. Date: Dec. 6, 2018

(65) Prior Publication Data
US 2021/0159715 A1    May 27, 2021

Related U.S. Application Data

(60) Provisional application No. 62/513,102, filed on May 31, 2017.

(51) Int. Cl.
*H02J 7/34*     (2006.01)
*H02J 7/00*     (2006.01)
*H02J 1/10*     (2006.01)

(52) U.S. Cl.
CPC .............. *H02J 7/0063* (2013.01); *H02J 1/10* (2013.01); *H02J 7/0013* (2013.01)

(58) Field of Classification Search
CPC ........... H02J 7/0063; H02J 7/0013; H02J 1/10
(Continued)

(56) References Cited

U.S. PATENT DOCUMENTS 6,304,059 B1    10/2001 Chalasani et al.
8,716,892 B2     5/2014 Min et al.
(Continued)

OTHER PUBLICATIONS

Kutkut et. al.: "Charge equalization for series connected battery strings",IEEE Transactions on Industry Applications, 1995, vol. 31 Issue:3, pp. 562-568.
(Continued)

*Primary Examiner* — Ryan Jager
(74) *Attorney, Agent, or Firm* — Armstrong Teasdale LLP

(57) ABSTRACT

Controlling an energy storage system includes providing one or more constraints to an optimization problem algorithm, determining by the optimization problem algorithm a DC bus voltage value that results in an minimum total power dissipation for the plurality of power converters, calculating a respective control variable for each of the respective plurality of power converters based on the determined DC bus voltage value, and generating control processor executable instructions to implement control of each of the plurality of power converters to achieve the calculated respective control variable. A system for implementing the method and a non-transitory computer-readable medium are also disclosed.

20 Claims, 4 Drawing Sheets

(58) Field of Classification Search
USPC .......................................................... 307/18
See application file for complete search history.

(56) References Cited

U.S. PATENT DOCUMENTS

| | | |
|---|---|---|
| 8,963,365 B2 | 2/2015 | King et al. |
| 9,000,614 B2 | 4/2015 | King et al. |
| 9,444,275 B2 | 9/2016 | Huang et al. |
| 9,548,619 B2 | 1/2017 | Gazit |
| 2014/0097797 A1* | 4/2014 | Hendrix .............. H01M 10/482 |
| | | 320/118 |
| 2016/0028237 A1 | 1/2016 | Ito |
| 2016/0218543 A1 | 7/2016 | Ishida |
| 2017/0057363 A1 | 3/2017 | Huh et al. |
| 2019/0334349 A1* | 10/2019 | Liu ....................... H02J 7/0063 |
| 2020/0176988 A1* | 6/2020 | Webb ...................... H02J 3/382 |
| 2021/0036514 A1* | 2/2021 | Uto ................... H02M 3/33584 |
| 2021/0066912 A1* | 3/2021 | Mitsunaga ............. H01M 10/48 |

OTHER PUBLICATIONS

Lahlou et. al.: "Stabilization of the DC-link voltage in a two stage cascaded H-Bridge multilevel converter for battery energy storage systems", Energy Conference (ENERGYCON), 2016 IEEE International; 2016; pp. 1-6.

International Search Report and Written Opinion dated Aug. 16, 2018 which was issued in connection with PCT/US18/035066 which was filed on May 30, 2018.

Poshtkouhi et. al.: A dual active bridge DC-DC converter with optimal DC-link voltage scaling and flyback mode for enhanced low-power operation in hybrid PV/stoage systems:, 2014 International Power Electronics Conference May 1, 2014 pp. 2336-2342.

\* cited by examiner

CONTROL SYSTEM AND METHOD FOR AN ENERGY STORAGE SYSTEM

CLAIM OF PRIORITY

This patent application claims, under 35 U.S.C. § 119, the priority benefit of U.S. Provisional Patent Application Ser. No. 62/513,102, filed May 31, 2017, titled "CONTROL SYSTEM AND METHOD FOR AN ENERGY STORAGE SYSTEM" the entire disclosure of which is incorporated herein by reference.

BACKGROUND

The worldwide demand for electrical energy has been increasing year over year. Most of the electrical energy demand is met by energy produced from conventional fossil fuel energy sources such as coal and gas. In recent years, with the rising global climate change issues, there has been a push for electricity generation from renewable energy sources such as solar, wind, geothermal, and other sources.

Wind turbine generators are regarded as environmentally friendly and relatively inexpensive alternative sources of energy that utilize wind energy to produce electrical power. Further, solar power generation uses photovoltaic (PV) modules to generate electricity from the sunlight. Because of the intermittency of wind and solar during the day and the lack of sun power at night, the power output from wind turbines and PV arrays fluctuate throughout the day. Unfortunately, the electricity demand does not vary in accordance with solar and wind variations.

Energy storage systems can mitigate the issue of power variability from renewable energy sources. The excess power from renewable energy plants can be stored in the energy storage system which can then be used at a later time or at a remote location. Energy storage systems could include battery storage and other options such as a flywheel storage or pumped hydroelectric storage. With the reduction in battery costs, and because hydroelectric electric generation is not always an option, batteries are increasingly becoming the storage medium of choice. The power flow from the batteries has to be regulated by an electronic power converter to ensure maximum flexibility, integration with solar or wind, long term operation, low degradation, and ease of maintenance. Battery energy storage systems are usually coupled to the AC grid via an inverter which allows charging from the grid. These storage systems are referred to as AC coupled systems and are used to mitigate frequency variations, suppress harmonics, support the grid voltage, and enhance the grid power quality.

Battery energy storage systems generally include power or energy batteries, electronic power converters, and a control processor. A plurality of batteries can be connected to a common DC bus in the energy storage system. In such an implementation, the energy storage system may not operate optimally due to mismatches between battery voltages and capacities as the battery cells age or are exposed to different thermal gradients. The voltage mismatch can also lead to current circulation between battery strings, hence damaging the batteries.

Therefore, a method and a system that will address the foregoing issues is desirable.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

Embodying systems and methods generally provide control of an energy storage system that includes a plurality of batteries to optimize the operation of the energy storage system. Data obtained by solving an optimization problem algorithm is used by a central control processor to provide local control processors with control signals tailored to adjust an output voltage from respective power converters so that the cumulative power processed by the power converters is minimized.

Figure 1:
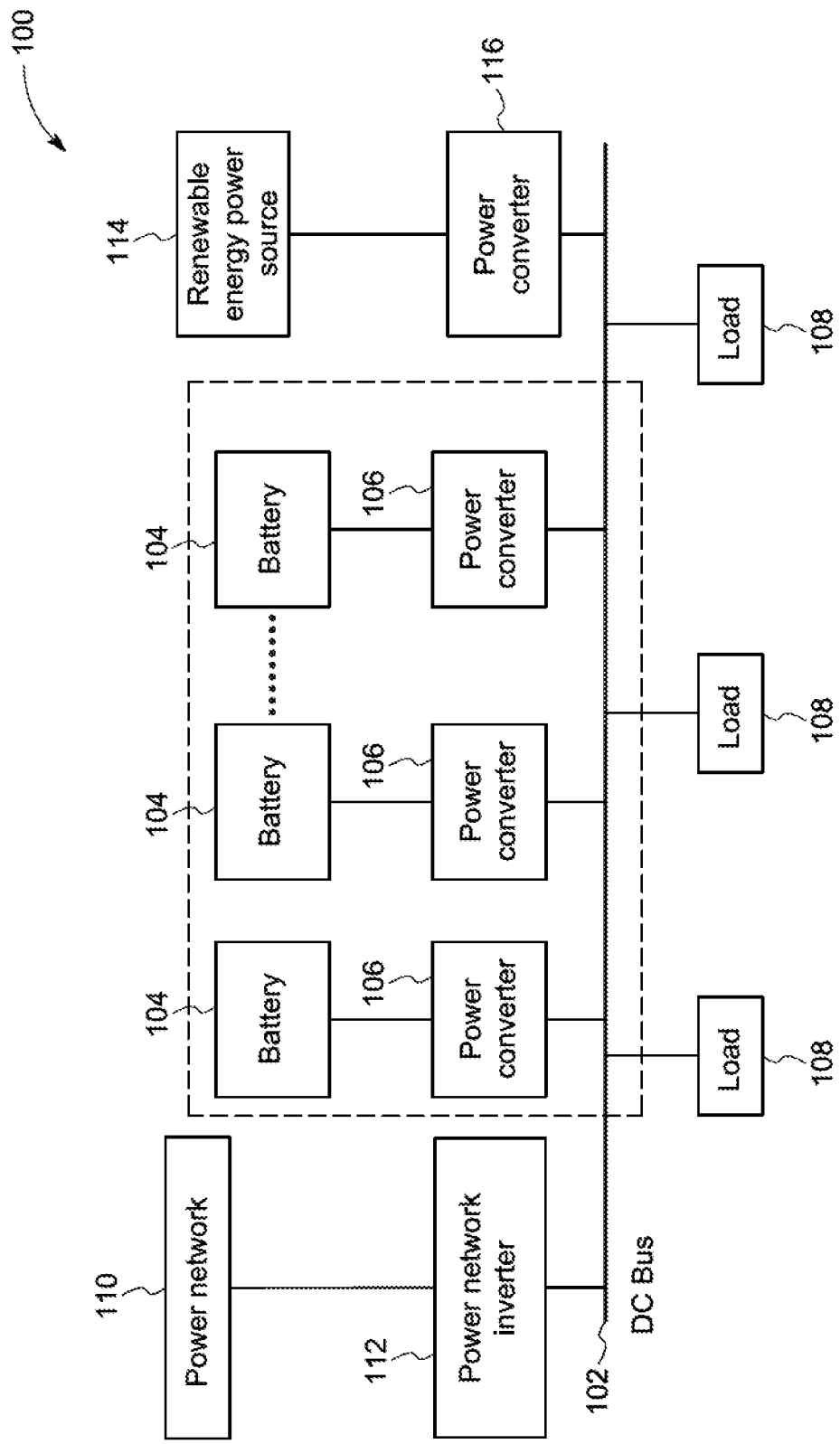
FIG. 1 illustrates a schematic diagram of a conventional energy storage system.

FIG. 1 illustrates conventional DC-coupled energy storage system 100, which includes DC bus 102. A plurality of batteries 104 is connected to the DC bus through a respective plurality of power converters 106. The power converters 106 may charge the batteries 104 from a power grid 110, or a renewable energy power source 114. Energy can be provided to loads 108 connected to the DC bus 102 from the plurality of batteries 104. Each of the plurality of batteries can include a plurality of battery cells connected in series and/or parallel.

The power converter connected to a battery can facilitate transfer of energy from one battery 104 to another battery 104 and/or from one battery cell to another battery cell within one battery 104. The batteries in each battery 104 may get charged from the DC bus, and/or may provide energy to loads 108 connected to the DC bus. The one or more of plurality of power converters 106 may include a buck converter, a boost converter, a buck-boost converter, a flyback converter or any other suitable DC-to-DC power converter. Loads 108 can include a car charger, electric drives, lighting loads etc. When a particular load is an alternating current (AC) load a DC-to-AC converter may be used between the DC bus 102 and the AC load(s).

In some implementations, the DC bus of energy storage system 100 may be connected to AC power grid 110 via a grid-tied inverter 112. The power grid can be a consumer, commercial, and/or utility scale power grid. In some implementations the energy storage system may also be connected to renewable energy power source 114, which can generate energy from one or more renewable energy generation sources (e.g., photovoltaic (PV) panels, wind turbines, geothermal exchanges, or any other renewable energy generation source). The renewable energy power source 114 is connected to the energy storage system via a power converter 116.

By controlling the DC bus voltage, batteries 104 may be charged from power grid 110 and renewable energy power source 114. Moreover, batteries 104 might also supply power to the power grid. Further, power converter 116 can be controlled such that maximum power is extracted from the renewable energy power source 114.

Figure 2:
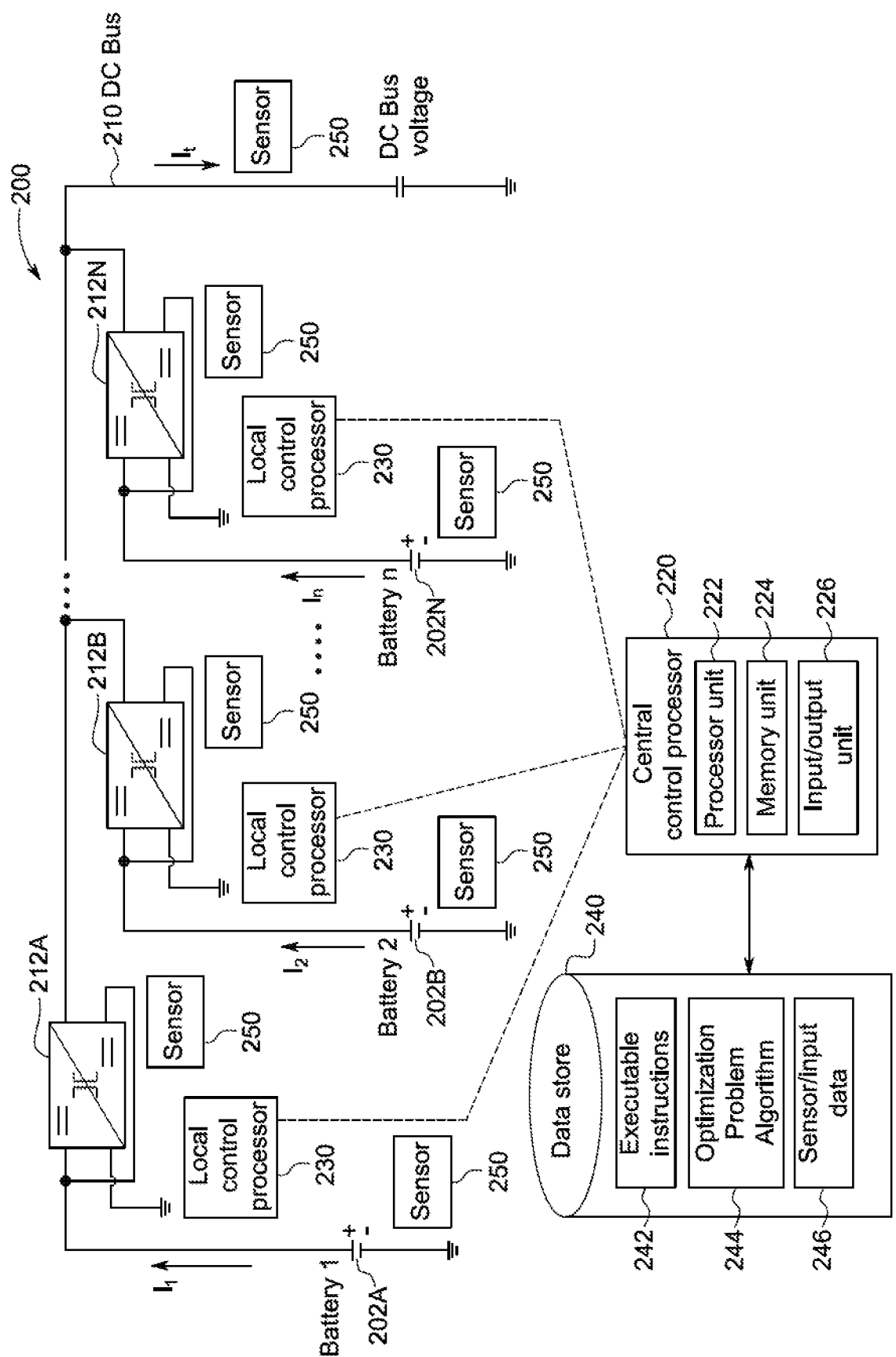
FIG. 2 illustrates a partial schematic of an energy storage system in accordance with embodiments.

FIG. 2 illustrates a partial schematic of energy storage system 200 in accordance with embodiments. Energy storage system 200 can include one or more battery 202A, 202B, ..., 202N coupled to DC bus 210. Each of battery 202A, 202B, ..., 202N is connected to DC bus 210 through a respective power converter 212A, 212B, ..., 212N. Each of the plurality of power converters 212A, 212B, . . . , 212N can be a partial power converter. A partial power converter has an input section configured to receive a first portion of a DC power, an output section configured to output a DC power that includes a first processed portion of the received DC power and an unprocessed second portion of the received DC power. Power converters 212A, 212B, . . . , 212N are connected such that they process only a part of the energy from batteries 202A, 202B, . . . , 202N to the DC bus 210. The remaining energy of batteries 202A, 202B, . . . , 202N is transferred directly from the batteries to the DC bus through the power converter without processing. The partial power converter configuration leads to lower heat generation due to lower losses in the plurality of power converters 212A, 212B, . . . , 212N. Accordingly, system 200 requires reduced cooling, which can permit a reduction of the system's footprint compared to systems operating under conventional approaches.

DC bus 210 can be connected through power grid-tied inverter 112 to power grid 110. The power grid-tied inverter can either source power to DC bus 210 from the power grid, or provide power from the DC bus to the power grid.

A plurality of sensor 250 can be distributed at multiple locations of the energy storage system. Dependent on its location, a sensor can monitor battery voltage, battery line current, battery and/or power converter temperature, power converter operation, DC bus voltage, and/or other operating parameter status.

Central control processor 220 includes processor unit 222, which executes executable instruction 242 to perform optimization problem algorithm 244 in accordance with embodiments. The central control processor can also include input/output unit 224, through which the central control processor is in communication with respective local control processors 230 of respective battery 202A, 202B, . . . , 202N, The central control processor can include memory unit 226 for local memory and/or cache operations. Central control processor 220 can be in communication with data store 240 across an electronic communication network, or be in direct connection with the data store.

Central control processor 220 and each local control processor 230 can be a control processor implemented as a programmable logic device (e.g., a complex programmable logic device (CPLD), field programmable gate array (FPGA), Programmable Array Logic (PAL), a microcontroller, application-specific integrated circuit (ASIC), etc.). The communication from central control processor to local control processors could be digital communication. In accordance with implementations, communication can be wireless, or wired, and can include various protocols—e.g., RS 232 communication, Bluetooth, WIFI, ZigBee, TCP/IP, etc.

Each local control processor 230 can include a processor unit, a memory unit, an input/output unit, with executable instructions stored in the memory unit. In some implementations the local control processor can also include an analog-to-digital converter to convert received analog signals (from, for example, sensors), a user interface (e.g., visual display, printer, etc.) that can indicate current status or other information and parameters. The local control processor may also include a digital to analog converter for conversion of digital signals into analog signals to control the power converters.

Data store 240 can include executable instructions 242, optimization problem algorithm 244, and sensor/input data records 246. The sensor/input data records can include monitored sensor readings obtained from one or more sensors 250. The local control processors can monitor one or more sensors 250 located at various locations of energy storage system 200, and provide the data to the data store. The sensors can monitor, dynamically sense, and/or measure data such as, but not limited to, battery, operating conditions, power converter operating conditions, the DC bus voltage, power network conditions, environmental conditions (e.g., solar irradiance, temperature, wind speed, etc.). Battery operating conditions can include, battery life, detection of battery fault(s), etc. Input data stored in sensor/input data records 246 can include specification, characteristics, and/or parameters pertaining to the batteries, power converters and network-side inverter—for example, but not limited to, battery voltage/current limits, battery life, temperature limits, bus voltage/current capacity limits, and other constraints. This input data can be used by the optimization problem algorithm.

The power processed by respective power converters 212A, 212B, . . . , 212N can depend on a difference between the respective battery voltage ($V_{B1}, V_{B2}, \ldots, V_{Bn}$) and DC bus 210 voltage ($V_{Bus}$). The smaller the difference between the voltage of respective battery 202A, 202B, . . . , 202N and the DC bus voltage, the smaller the power processed in the converter. In accordance with embodiments, central control processor 220 can provide control commands to one or more of respective local control processor 230 to adjust the respective power converter to control the DC bus voltage to a reference DC bus voltage ($V_{ref}$) that can minimize the cumulative total power processed by the plurality of power converters. The control commands from the central control processor can be tailored to the respective battery 202A, 202B, . . . , 202N—i.e., each power converter can be adjusted independently.

In accordance with an embodiment, control processor 220 can control the DC bus voltage by manipulation of the modulation index of grid-tied inverter 112. The inverter modulation index is a ratio of the inverter's peak-to-peak alternating current (AC) voltage to the inverter's DC voltage. In accordance with an embodiment, if one or more of loads 108 includes a power electronic converter (e.g., Electric Vehicle (EV) charging load), the control processor 220 can also provide control commands for the load's power electronic converter to control the DC bus voltage.

In accordance with embodiments, an optimization problem algorithm determines a reference voltage ($V_{ref}$) value for the voltage ($V_{Bus}$) of DC bus 210 that can result in an about maximum DC-to-DC power conversion efficiency for each power converter 212A, 212B, . . . , 212N. Maximizing the power conversion efficiency of each power converter results in an overall high power conversion efficiency for the system. Given a quantity N number of batteries, each with a respective battery voltage $V_{B1}, VB_{B2}, \ldots, V_{Bn}$ and DC bus voltage $V_{Bus}$, the optimization problem can be expressed as minimizing the average (or in some implementations, the maximum) power dissipated in each of the power converters. Alternatively, the optimization problem can be expressed as minimizing the total power loss dissipated in all the power converters connected to the batteries. The optimization problem solution is a DC bus voltage such that the overall power processed from all power converters is about minimized. The constraints for the optimization problem can include temperature limits on batteries, current limits of the batteries, DC bus voltage limit, age of the batteries, or combinations thereof.

In accordance with embodiments, the optimization solution can minimize the average power dissipated in each battery string level converter; or minimize the maximum power dissipated in any battery string level converter; or minimize total power loss dissipated in all DC-DC converters connected to battery strings. Constraints to the optimization result can include, but are not limited to, battery temperature range limit; battery string current capacity limit; DC bus voltage limit; battery age; component cooling requirements, age variation intra- and/or inter-battery string; and battery type. In some implementations, the optimization solution can minimize the temperature dissipated in each battery string level converter and/or in the battery of each string.

The solution of the optimization problem (i.e., $V_{ref}$) can be expressed as:

$$V\text{ref} \gg V\min \quad (EQ. 1)$$

$$I1 \in [I1_{min}, I1_{max}], \ldots, In \in [In_{min}, In_{max}] \quad (EQ. 2)$$

Where a minimum allowable DC bus voltage ($V_{Bus\_min}$) is based on grid-tied inverter characteristics;

I1, ..., In represents the current through a battery line L1, ..., Ln;

$[I1_{min}, I1_{max}], \ldots, [In_{min}, In_{max}]$ represents the respective current ranges for battery lines L1, ..., Ln; and where for each battery line, the respective current ranges depend on the respective battery voltages $V_{B1}, \ldots, V_{Bn}$ and the respective state-of-charge (SOC) values SOC1, ..., SOCn of each battery line.

Figure 3A:
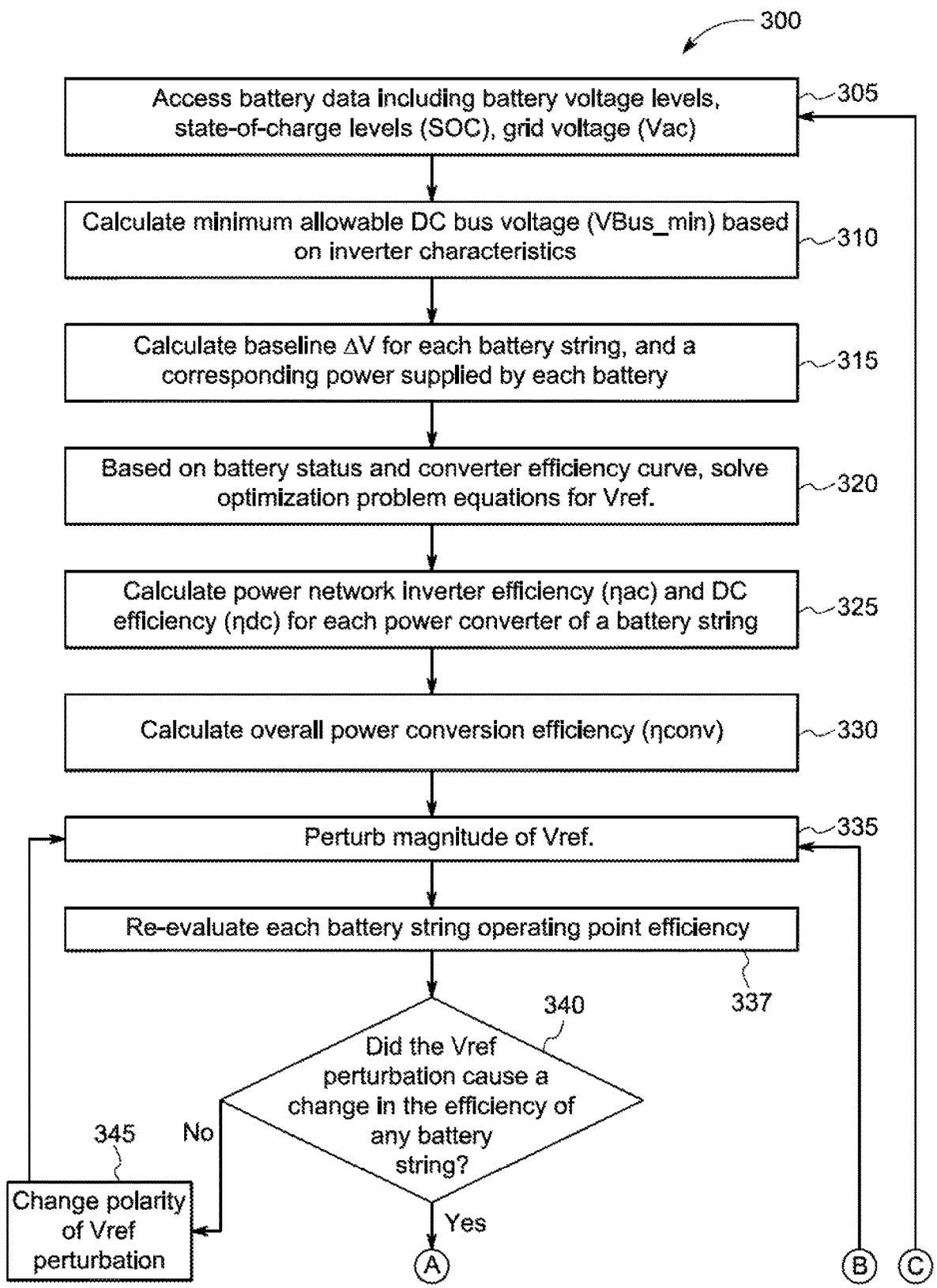
FIGS. 3A-3B illustrate a flowchart for solving an optimization problem in accordance with embodiments.
Figure 3B:
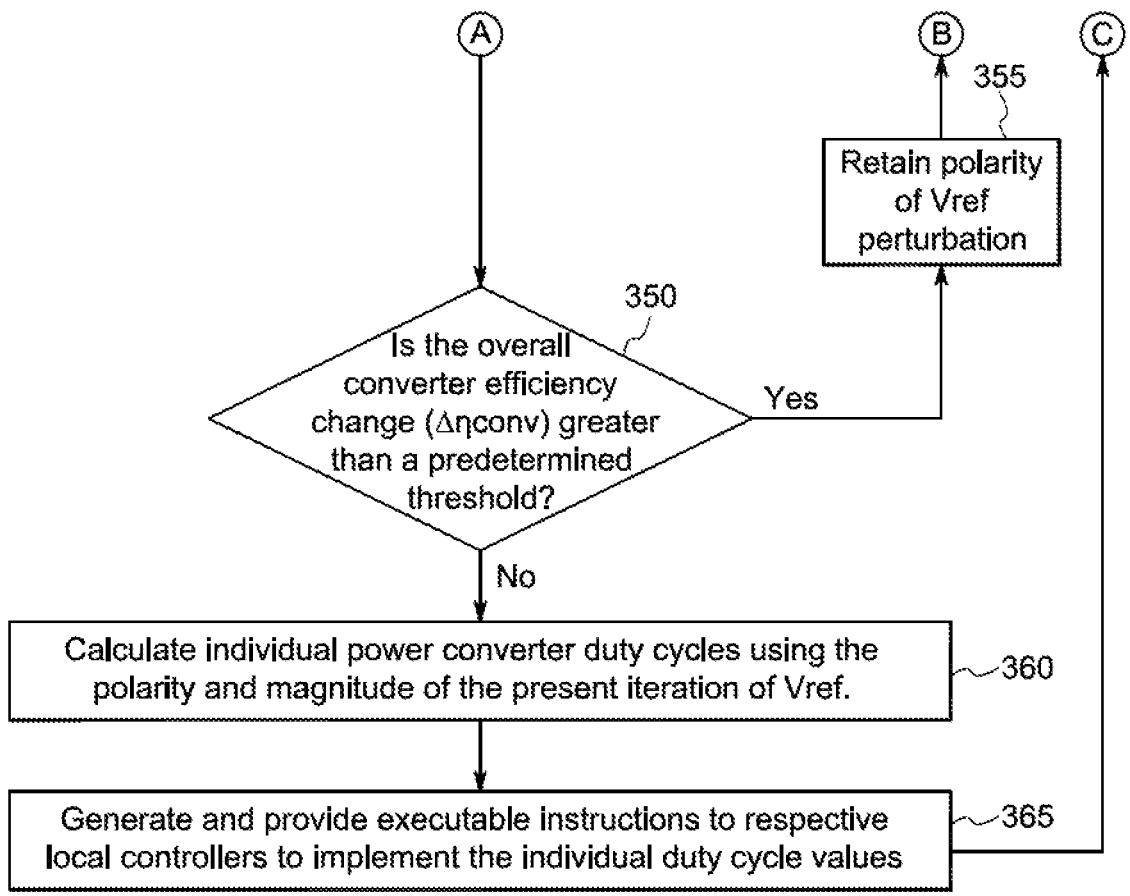

FIGS. 3A-3B illustrate a flowchart of process 300 for solving an optimization problem in accordance with embodiments to control an energy storage system. Sensor data and input data for use in solving the optimization problem is accessed, step 305. The sensor data can be obtained from the sensors, or accessed from sensor/input data records 246—including, but not limited to, battery string (and constituent individual battery) voltage levels, state-of-charge (SOC) for the batteries, grid voltage (Vac). In one embodiment, the central control processor utilizes the modulation index of the grid-tied converter to determine the DC bus voltage. Input data can include parameters and characteristics of the batteries, power converters, grid-tied inverter, loads, etc. In one embodiment, the grid-tied inverter characteristics include an efficiency curve, a power rating, and the modulation index of the grid-tied inverter. In accordance with embodiments, an optimization solution can balance power among one or more batteries 202A, 202B, ..., 202N based on power curves and temperature.

A minimum allowable DC bus voltage ($V_{Bus\_min}$) is calculated, step 310, based on grid-tied inverter characteristics. $V_{Bus\_min}$ is a constraint on the DC bus voltage because at voltages lower than $V_{Bus\_min}$, the grid-tied inverter may not operate at an optimum performance efficiency—i.e., a performance efficiency above a preselected value.

A baseline voltage difference ΔV between $V_{Bus\_min}$ and the battery string voltages $V_{B1}, V_{B2}, \ldots, V_{Bn}$ is calculated, step 315. At step 320, $V_{ref}$ is determined by solving an optimization problem (EQs. 1 and 2) to maximize the efficiency of power converters 212A, 212B, ..., 212N. The optimization problem can include a plurality of constraints (e.g., maintaining $V_{ref} > V_{Bus\_min}$, and maintaining current through each power converter within a minimum and maximum range. Operating conditions, characteristics, and/or parameters of the batteries can constrain the optimization problem. In one embodiment, the minimum and maximum power converter current range can be determined based on the batteries' state of charge and voltages.

A grid-tied inverter efficiency ($\eta ac$) and a DC efficiency ($\eta dc$) for each power converter is calculated, step 325. An overall total power conversion efficiency ($\eta conv$) for each power converter is calculated, step 330, by Equation 3:

$$\eta_{conv} = \eta_{ac} * \left( \frac{P_1}{P_{tot}} \eta_{dc1} + \frac{P_2}{P_{tot}} \eta_{dc3} + \ldots + \frac{P_n}{P_{tot}} \eta_{dcn1} \right) \quad (EQ. 3)$$

The magnitude of Vref is perturbed, step 335. The operating point efficiency of each battery string is re-evaluated using Equation 3, step 337, by applying the now-perturbed value of Vref. An evaluation is made, step 340, to determine if a perturbation in Vref caused a change in total power conversion efficiency ηconv—i.e., by inducing a change in the efficiency for any of the battery strings. In accordance with embodiments, the evaluation is performed by subtracting the most recent total power conversion efficiency from the second most recent total power conversion to obtain an absolute difference between these two total power conversion efficiencies.

If there is no change in the total converter efficiency, the polarity (perturbation direction) of the Vref perturbation is changed, step 345. Process 300 then continues back to step 335.

If a determination is made that the total converter efficiency has changed (at step 340), process 300 continues to step 350. At step 350, the total converter efficiency is compared to a predetermined threshold. If the total converter efficiency is greater than the predetermined threshold, the perturbation polarity is retained, step 355. Process 300 then continues back to step 335. The predetermined threshold can be defined based on overall design goals for the energy storage system itself—for example, based on system efficiency design performance as a function of conversion voltages, based on power converter efficiency, other component/system factors, or a combination thereof.

If the total converter efficiency is not greater than the predetermined threshold, then process 300 continues to step 360. At step 360, the individual duty cycles for power converters 212A, 212B, ..., 212N and the grid-tied inverter are calculated using the magnitude of the present iteration of Vref. Central control processor 220 can generate executable instructions and provide the instructions, step 365, to respective local controllers 214, 216 for control of the power converters and inverter to implement the individual duty cycle values. Individual duty cycles for the power converters and the grid-tied inverter are just one type of control variable that can be calculated using the magnitude of the present iteration of Vref. In addition to duty cycle, other control variables that can be calculated include, but are not limited to, frequency and phase shift.

Embodying systems and methods increase the efficiency of the DC-to-DC conversion stage in the energy storage system. With this increased efficiency, smaller and lower cost DC-to-DC power converters can be integrated with the battery strings to locally optimize each string. The increased efficiency alleviates the performance degradation of conventional systems due to battery string mismatches. Because of a reduction in generated heat loss, embodying systems and methods reduce the energy storage system cooling requirements, and provide embedded local protection within the energy storage system.

For partial-power converters, the power processed in the converter is proportional to the difference between Vbattery and Vref (ΔV=|Vbattery−Vref|). Therefore, setting Vref such that ΔV is minimized enables the minimization of the rating of the DC/DC converter (e.g., if ΔV/Vbattery=20%, then you can design a 12 kW converter for a 60 kW string power with 48 kW fed forward), which results in a very high efficiency conversion. For full-power processing converters, minimizing ΔV minimizes the converter duty cycle/utilization, which improves the overall conversion efficiency Embodying systems and methods can be implemented on energy storage systems independent of the manufacturing technologies of the power devices, and batteries incorporated into the energy storage system. For example, power converters made with wide bandgap materials (silicon carbide, gallium nitrate, etc.) are within the scope of this disclosure. Additionally, batteries of different strengths, ages, and/or chemistries (whether degraded or not) are also within the scope of this disclosure.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform methods disclosed herein, such as a method of solving an optimization problem to minimize the cumulative power processed by power converters of an energy storage system, as described above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. A method of controlling an energy storage system, the energy storage system including a plurality of batteries that provide a DC voltage output coupled through a respective plurality of power converters to a DC bus, the method comprising:
   providing one or more constraints for incorporation into an optimization problem algorithm;
   determining, via implementation of the optimization problem algorithm, a DC bus voltage (VBus) value that results in an about minimum total power dissipation for the plurality of power converters;
   calculating a respective control variable for each of the respective plurality of power converters based on the determined DC bus voltage value;
   generating control processor executable instructions to implement control of each of the respective plurality of power converters to achieve the calculated respective control variable; and
   providing to at least one processor the executable instructions, which when executed by the at least one processor cause the at least one processor to command respective ones of the plurality of power converters to operate based on the calculated respective control variable.

2. The method of claim 1, at least one of the plurality of power converters being a partial power converter, the method including commanding the at least one partial power converter to operate based on the calculated respective control variable for that portion of power processed by the at least one partial power converter.

3. The method of claim 1, the implementation of the optimization problem algorithm including:
   determining a first DC bus reference voltage (Vref);
   perturbing the first DC bus reference voltage value in a first direction at a first magnitude to obtain a second DC bus reference voltage;
   subtracting a first overall power conversion efficiency from a second overall power conversion efficiency to obtain an absolute difference, the first overall power conversion efficiency based on the first DC bus reference voltage and the second overall power conversion efficiency based on the second DC bus reference voltage; and
   if the absolute difference is less than or equal to a predetermined threshold, then calculating the respective power converter control variable based on the second DC bus reference voltage value;
   else if the signed difference is greater than a predetermined threshold, then retaining the perturbation direction, increasing the magnitude of the perturbation, and recalculating the second power conversion efficiency.

4. The method of claim 3, including calculating the second overall power conversion efficiency using a grid-tied inverter efficiency and an efficiency of each respective power converter.

5. The method of claim 3, including solving the optimization problem algorithm to obtain the first DC bus reference voltage by:
   constraining the first DC bus reference voltage to be greater than a minimum DC bus voltage; and
   constraining a respective current through each respective one of the plurality of power converter to be within a predetermined range.

6. The method of claim 5, including determining the predetermined range for each respective current based on a respective battery voltage and a respective state-of-charge value for each respective one of the plurality of batteries coupled to the respective power converter.

7. The method of claim 1, the one or more constraints including at least one of a respective battery status and a respective power conversion efficiency curve for each one of the plurality of batteries and each respective one of the plurality of power converters.

8. The method of claim 1, including constraining a minimum DC bus voltage to one of a plurality of values that cause a grid-tied inverter to operate at a performance efficiency above a predetermined efficiency.

9. A non-transitory computer-readable medium having stored thereon instructions which when executed by a processor cause the processor to perform a method of controlling an energy storage system, the energy storage system including a plurality of batteries that provide a DC voltage output coupled through a respective plurality of power converters to a DC bus, the method comprising:
   providing one or more constraints for incorporation into an optimization problem algorithm;
   determining, via implementation of the optimization problem algorithm, a DC bus voltage (VBus) value that results in an about minimum total power dissipation for the plurality of power converters;

calculating a respective control variable for each of the respective plurality of power converters based on the determined DC bus voltage value;

generating control processor executable instructions to implement control of each of the respective plurality of power converters to achieve the calculated respective control variable; and providing to at least one processor the executable instructions, which when executed by the at least one processor cause the at least one processor to command respective ones of the plurality of power converters to operate based on the calculated respective control variable.

10. The medium of claim 9, including executable instructions to cause the processor to solve the optimization problem algorithm by:

determining a first DC bus reference voltage (Vref);

perturbing the first DC bus reference voltage value in a first direction at a first magnitude to obtain a second DC bus reference voltage;

subtracting a first overall power conversion efficiency from a second overall power conversion efficiency to obtain an absolute difference, the first overall power conversion efficiency based on the first DC bus reference voltage and the second overall power conversion efficiency based on the second DC bus reference voltage; and if the absolute difference is less than or equal to a predetermined threshold, then calculating the respective power converter control variable based on the second DC bus reference voltage value;

else if the signed difference is greater than a predetermined threshold, then retaining the perturbation direction, increasing the magnitude of the perturbation, and recalculating the second power conversion efficiency.

11. The medium of claim 10, including executable instructions to cause the processor to solve the optimization problem algorithm by:

constraining the first DC bus reference voltage to be greater than a minimum DC bus voltage; and constraining a respective current through each respective one of the plurality of power converter to be within a predetermined range.

12. The medium of claim 9, including executable instructions to cause the processor to solve the optimization problem algorithm by including as the one or more constraints at least one of a respective battery status and a respective power conversion efficiency curve for each one of the plurality of batteries and each respective one of the plurality of power converters.

13. The medium of claim 9, including executable instructions to cause the processor to solve the optimization problem algorithm by calculating the second overall power conversion efficiency using a grid-tied inverter efficiency and an efficiency of each respective power converter.

14. The medium of claim 9, including executable instructions to cause the processor to solve the optimization problem algorithm by constraining a minimum DC bus voltage to one of a plurality of values that cause a grid-tied inverter to operate at a performance efficiency above a predetermined efficiency.

15. A system for controlling an energy storage system, the energy storage system comprising:

a plurality of batteries that provide a DC voltage output, each one of the plurality of batteries coupled through a respective plurality of power converters to a DC bus;

a first processor in communication with a plurality of second processors, a respective second processor in communication with a respective one of the plurality of power converters;

the first processor in communication with a data store containing executable instructions which when executed by the first processor cause the first processor to perform a method including:

providing one or more constraints for incorporation into an optimization problem algorithm;

determining, via implementation of the optimization problem algorithm, a DC bus voltage (VBus) value that results in an about minimum total power dissipation for the plurality of power converters;

calculating a respective control variable for each of the respective plurality of power converters based on the determined DC bus voltage value;

generating control processor executable instructions to implement control of each of the respective plurality of power converters to achieve the calculated respective control variable; and providing to at least one processor the executable instructions, which when executed by the at least one processor cause the at least one processor to command respective ones of the plurality of power converters to operate based on the calculated respective control variable.

16. The system of claim 15, including at least one of the plurality of power converters being a partial power converter, the executable instructions to cause the processor to solve the optimization problem algorithm by commanding the at least one partial power converter to operate based on the calculated respective control variable for that portion of power processed by the at least one partial power converter.

17. The system of claim 15, wherein the executable instructions are executable by the at least one processor to solve the optimization problem algorithm by:

determining a first DC bus reference voltage (Vref);

perturbing the first DC bus reference voltage value in a first direction at a first magnitude to obtain a second DC bus reference voltage;

subtracting a first overall power conversion efficiency from a second overall power conversion efficiency to obtain an absolute difference, the first overall power conversion efficiency based on the first DC bus reference voltage and the second overall power conversion efficiency based on the second DC bus reference voltage; and if the absolute difference is less than or equal to a predetermined threshold, then calculating the respective power converter control variable based on the second DC bus reference voltage value;

else if the absolute difference is greater than a predetermined threshold, then retaining the first direction, increasing the magnitude of the perturbation, and recalculating the second power conversion efficiency.

18. The system of claim 15, wherein the executable instructions are executable by the at least one processor to solve the optimization problem algorithm by including as the one or more constraints at least one of a respective battery status and a respective power conversion efficiency curve for each one of the plurality of batteries and each respective one of the plurality of power converters.

19. The system of claim 15, wherein the executable instructions are executable by the at least one processor to solve the optimization problem algorithm by calculating the second overall power conversion efficiency using a grid-tied inverter efficiency and an efficiency of each respective power converter.

20. The system of claim 15 wherein the executable instructions are executable by the at least one processor to solve the optimization problem algorithm by constraining a minimum DC bus voltage to one of a plurality of values that cause a grid-tied inverter to operate at a performance efficiency above a predetermined efficiency.

\* \* \* \* \*